United States Patent [19]

Milliren

[11] Patent Number: 4,876,292
[45] Date of Patent: Oct. 24, 1989

[54] ISOCYANATE REACTIVE MIXTURE AND THE USE THEREOF IN THE MANUFACTURE OF FLEXIBLE POLYURETHANE FOAMS

[75] Inventor: Charles M. Milliren, Coraopolis, Pa.
[73] Assignee: Mobay Corporation, Pittsburgh, Pa.
[21] Appl. No.: 254,326
[22] Filed: Oct. 6, 1988
[51] Int. Cl.$^4$ ............................................. C08G 18/32
[52] U.S. Cl. ................................. 521/159; 521/160; 521/163; 521/167
[58] Field of Search ................ 521/159, 163, 160, 167

[56] References Cited

U.S. PATENT DOCUMENTS

| | | | |
|---|---|---|---|
| 3,067,148 | 12/1962 | Sandridge et al. | 260/2.5 |
| 3,948,825 | 4/1976 | Pray | 260/2.5 |
| 4,048,102 | 9/1977 | Quock et al. | 521/131 |
| 4,239,856 | 12/1980 | Rowton | 521/118 |
| 4,256,849 | 3/1981 | Ick et al. | 521/129 |
| 4,261,852 | 4/1981 | Carroll et al. | 528/59 |
| 4,269,945 | 5/1981 | Vanderhider et al. | 521/159 |
| 4,269,946 | 5/1981 | Sullivan | 521/163 |
| 4,296,213 | 10/1981 | Cuscurida et al. | 521/166 |
| 4,365,025 | 12/1982 | Murch et al. | 521/159 |
| 4,495,081 | 1/1985 | Vanderhider et al. | 252/182 |
| 4,530,941 | 7/1985 | Turner et al. | 521/176 |
| 4,569,952 | 2/1986 | Radovich et al. | 521/167 |
| 4,585,804 | 4/1986 | Lancaster et al. | 521/128 |
| 4,687,788 | 8/1987 | Hillshafer et al. | 521/163 |
| 4,716,182 | 12/1987 | Hess et al. | 521/163 |
| 4,742,091 | 5/1988 | Grigsby, Jr. et al. | 521/163 |
| 4,792,575 | 12/1988 | Takao et al. | 521/157 |

OTHER PUBLICATIONS

Amines Bulletin (Dytek® A Amine (2-Methylpentamethylenediamine, MPMD)).

Primary Examiner—Maurice J. Welsh
Assistant Examiner—L. Henderson
Attorney, Agent, or Firm—Gene Harsh; Joseph C. Gil

[57] ABSTRACT

The present invention is directed to a reactive mixture for use in preparing a flexible polyurethane foam and to the foams produced therefrom. The reactive mixture broadly comprises (A) from more than 0 up to 3 parts by weight per 100 parts by weight of components (B) and (C) of an amine of the formula:

$$H_2N-R-NH_2$$

where R is a $C_4$ to $C_{10}$ straight or branched alkylene group, or a $C_4$ to $C_{15}$ alicyclic group, (B) from 0 to 30% by weight of a polyoxyalkylene polyamine having a molecular weight of from about 400 to about 5000 and containing from 2 to 3 primary amino groups, and (C) from 700 to 100% by weight of one or more polyether polyhydroxyl compounds having hydroxyl functionalities from about 2 to 3 and molecular weights of from about 1000 to about 10,000, the percents of components (B) and (C) totalling 100%.

8 Claims, No Drawings

ISOCYANATE REACTIVE MIXTURE AND THE USE THEREOF IN THE MANUFACTURE OF FLEXIBLE POLYURETHANE FOAMS

BACKGROUND OF THE INVENTION

It is known in the art to manufacture flexible polyurethane foams using mixtures of methylene bis(phenyl isocyanate) ("MDI") and polymethylene poly(phenyl isocyanate) ("polymeric MDI") and prepolymers based on such mixtures. See, e.g., U.S. Pat. Nos. 4,239,856, 4,256,849, 4,261,852, and 4,365,025. Typical isocyanate reactive materials suggested for use with such isocyanates include (i) mixtures of polyether triols having molecular weights of from 2000 to 7000 with diethanolamine (U.S. Pat. No. 4,239,856); (ii) mixtures of 400 to 10,000 molecular weight polyethers having primary hydroxyl groups with low molecular weight active hydrogen containing materials (U.S. Pat. No. 4,256,849); (iii) polyoxypropylene or poly(oxypropylene-oxyethylene) diols or triols having equivalent weights of from 700 to 2000 (U.S. Pat. No. 4,261,852) and (iv) water (U.S. Pat. No. 4,365,025).

It is also known to use various low molecular weight crosslinkers in the manufacture of flexible foams. U.S. Pat. No. 3,067,148 describes the use of tetrahydric compounds derived from ethylene diamine and alkylene oxides. U.S. Pat. No. 3,948,825 describes the use of reaction products of methylene dianiline and alkylene oxides. U.S. Pat. No. 4,569,952 describes the use of an addition product of an alkylene oxide and an aromatic diamine and a mixture of the addition product with an alkanolamine.

Finally, Dupont has recently introduced an amine sold as Dytek amine for a variety of uses. The Dytek amine is described as 2-methylpentamethylenediamine. Among the uses suggested in product bulletin entitled "Amines" is the use as a chain extender for polyurethanes.

While many foam formulations based on MDI and polymeric MDI give adequate properties for many applications, it is generally difficult to have good processability over a broad isocyanate index range. Additionally, it would be desirable to develop a foam having high tear strength, high elongation, and low compression set for automotive seating and headrests and for nonautomotive seating.

DESCRIPTION OF THE INVENTION

The present invention is directed to a reactive mixture for use in producing flexible polyurethane foams. The reactive mixture gives good processability over a broad isocyanate index range. Foams of a wide range of densities can be produced with good mold vent stability over a wide isocyanate index range. The flow times of the foam systems are extended, which, when combined with the improved vent stability, gives much improved molded parts. The foams produced from the reaction mixtures have improved green strength upon demold with reduced, and, in most cases, eliminated finger printing. In addition, the use of cell-openers is not required. Finally, when using the preferred formulations, the foams produced have high tear strengths, high elongations, and low compression sets.

More particularly, the isocyanate reactive mixtures of the present invention comprise:

(A) from more than 0 up to 3 parts by weight per 100 parts by weight of components (B) and (C) of an amine of the formula:

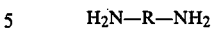

$$H_2N-R-NH_2$$

where R is a $C_3$ to $C_{10}$ straight or branched alkylene group or a $C_4$ to $C_{15}$ alicyclic group.

(B) from 0 to 30% by weight of a polyoxyalkylene polyamine having a molecular weight of from about 400 to about 5000 and containing from 2 to 3 primary amino groups, and (C) from 70 to 100% by weight of one or more polyether polyhydroxyl compounds having hydroxyl functionalities of from 2 to 3 and molecular weights of from about 1000 to about 10,000, the percents by weight of component (B) and component (C) totalling 100%.

Component (A) is preferably used in an amount of from 0.05 to 2.5 parts by weight and most preferably in an amount of from 0.25 to 1.5 parts by weight. Component (B) is preferably used in an amount of from 1 to 20% by weight and most preferably from 2.5 to 15% by weight, with component (C) preferably used in an amount of from 80 to 99% by weight and most preferably from 85 to 97.5% by weight. The preferred and most preferred ranges produce foams of the best overall physical properties. The foams of the present invention are prepared by reacting the above reaction mixture with a polymethylene poly(phenyl isocyanate) containing from about 40 to about 85% by weight of methylene bis(phenyl isocyanate) or a prepolymer of such isocyanate, with such prepolymer having an isocyanate content of from about 15 to about 30% by weight. The isocyanates useful herein are generally known and are produced by reacting phosgene with aniline/formaldehyde condensates. Known processes for preparing the aniline/formaldehyde condensates and the resultant polyisocyanates are described in the literature and in many patents, for example, U.S. Pat. Nos. 2,683,730, 2,950,263, 3,012,008, 3,344,162 and 3,362,979. Additionally useful isocyanates are described in U.S. Pat. No. 4,256,849, the disclosure of which is herein incorporated by reference. Useful prepolymers are described in U.S. Pat. No. 4,261,852, the disclosure of which is herein incorporated by reference. In general the isocyanate index is from 60 to 140, and is preferably from 90 to 120.

Component (A) of the reaction mixture of the present invention is an amine of the formula:

$$H_2N-R-NH_2$$

where R is a $C_3$ to $C_{10}$ straight or branched chain alkylene group or a $C_4$ to $C_{15}$ alicyclic group. Useful diamines include the various straight and branched chain isomers of diaminopropane, diaminobutane, diaminopentane, diaminohexane, diaminoheptane, diaminooctane, diaminononane, and diaminodecane. Specific useful diamines include 1,2- and 1,3-diaminopropane; 1,3-,2,3-, and 1,4-diaminobutane; 1,2-diamino-2-methylpropane; 1,5-diaminopentane; 1,4-diamino-1-methylbutane; 1,4-diamino-2-methylbutane; 1,3-diamino-1-ethylpropane; 1,3-diamino-1,1-dimethylpropane; 1,3-diamino-1,2-dimethylpropane; 1,3-diamino-2,2-dimethylpropane; 1,5-diamino-2-methylpentane; 1,6-diaminohexane and the like. Useful alicyclic diamines include the various isomers of diaminocyclobutane, diaminocyclopentane, diaminocyclohexane, diaminocycloheptane, diaminocyclooctane, and diaminocyclononane. Also useful are the diamino-1-methylcyclohexanes; the methylenebis(cyclohexylamines); the diamino-1-methylcyclopentanes; the diaminodimethylcyclohexanes; isophorone diamine; and the like. It is presently preferred to use those diamines where R is a branched chain alkylene group. The most preferred material is 1,5-diamino-2-methylpentane.

Component (B) of the reaction mixture is a polyoxyalkylene polyamine having a molecular weight of from about 400 to about 5000, and having from 2 to 3 primary amine groups. Such polyamines are known in the art. One method for preparing such amines is the amination of polyhydroxy polyethers (e.g.,polypropylene glycols) by a reaction with ammonia in the presence of Raney nickel and hydrogen (Belgian Patent No. 634,741). U.S. Pat. No. 3,654,370 discloses the preparation of polyoxyalkylene polyamines by reaction of the corresponding polyol with ammonia and hydrogen in the presence of a nickel, copper, or chromium catalyst. The preparation of polyethers containing amino end groups by the hydrogenation of cyanoethylated polyoxypropylene ethers is described in German Patent No. 1,193,671. Other methods for the preparation of polyoxyalkylene polyamines are described in U.S. Pat. Nos. 3,155,728 and 3,236,895 and French Patent No. 1,551,605. Commercially available polyether polyamines are sold by Texaco under the Jeffamine tradename.

Component (C) comprises one or more polyether polyhydroxyl compounds having hydroxyl functionalities of from 2 to 3, and having molecular weights of from about 1000 to about 10,000, and preferably from about 2000 to about 6000. Such polyethers are generally known in the art. These polyethers may be obtained by polymerizing epoxides, such as ethylene oxide, propylene oxide, butylene oxide, tetrahydrofuran, styrene oxide or epichlorohydrin in the presence of Lewis catalysts such as $BF_3$. Polymerization may also be accomplished by the addition of epoxides (preferably ethylene and/or propylene oxide) either in admixture or successively, to compounds containing reactive hydrogen atoms such as water or alcohols. Examples of suitable reactive compounds include ethylene glycol, 1,3- and 1,2-propylene glycol, trimethylol propane, glycerol and the like. Also useful are the polyethers containing high molecular weight polyadducts and polycondensates or polymers in finely dispersed or dissolved form. Such polyethers may be obtained by polyaddition reactions (for example, reactions between polyisocyanates and aminofunctional compounds) and polycondensation reactions (for example, between formaldehyde and phenols and/or amines) in situ in the above described polyethers. Such processes are described in German Auslegeschriften No. 1,168,075 and 1,260,142 and in German Offenlegungsschriften Nos. 2,324,134, 2,423,984, 2,512,385, 2,513,815, 2,550,796, 2,550,797, 2,550,833, 2,550,862, 2,633,293, and 2,639,254. See also U.S. Pat. Nos. 3,325,421, 4,042,537, 4,089,835, 4,293,470, 4,296,213, and 4,374,209. Also useful are the so-called polymer polyols obtained by polymerizing one or more ethylenically unsaturated monomers in a polyether. Such polymer polyols are described in U.S. Pat. Nos. 3,383,351, 3,304,273, 3,523,093, 3,110,685 and RE 28,715 and 29,118. Polymer polyols are commercially available from Bayer AG, BASF, and Union Carbide. Regardless of the specific polyether used herein, it is generally preferred to use polyethers containing primary hydroxyl groups.

According to the invention, water and/or readily volatile organic substances are used as blowing agents. Suitable organic blowing agents include, for example, acetone, ethyl acetate and halogen substituted alkanes such as methylene chloride, chloroform, ethylidene chloride, vinylidene chloride, monofluorotrichloromethane, chlorodifluoromethane as well as butane, hexane, heptane and diethyl ether. The effect of a blowing agent can also be obtained by the addition of compounds which decompose at temperatures above room temperature to release gases such as nitrogen, e.g., azo compounds such as azoisobutyric acid nitrile. Further examples of blowing agents and the use of blowing agents are known and have been described, e.g., in Kunststoff-Handbuch, Volume VII, published by Vieweg and Hochtlen, Carl-Hanser-Verlag, Munich 1966, e.g., on pages 108 and 109, 432 to 455 and 507 to 510.

Catalysts are also frequently used according to the invention. The catalysts added are generally known and include tertiary amines such as triethylamine, tributylamine, N-methylmorpholine, N-ethylmorpholine, N-cocomorpholine, N,N,N',N''-tetramethyl-ethylenediamine, 1,4-diaza-bicyclo-(2,2,2)-octane, N-methyl-N'-dimethyl-aminoethylpiperazine, N,N-dimethylbenzylamine, bis-(N,N-diethyl-aminoethyl)-adipate, N,N-diethylbenzylamine, pentamethyl-diethylenetriamine, N,N-dimethylcyclohexylamine, N,N,N',N'-tetramethyl-1,3-butanediamine, N,N-dimethyl-B-phenylethylamine, 1,2-dimethylimidazole, 2-methylimidazole and the like. Also useful are the commercially available tertiary amines such as Niax A1 and Niax A107, available from Union Carbide; Thancat DD, available from Texaco; and the like. Mannich bases known per se obtained from secondary amines such as dimethylamine and aldehydes, preferably formaldehyde, or ketones such as acetone, methyl ethyl ketone or cyclohexanone and phenols such as phenol nonylphenol or bisphenol may also be used as catalysts. Examples of catalyst which consist of tertiary amines having hydrogen atoms which are reactive with isocyanate groups include triethanolamine, triisopropanolamine, N-methyl-diethanolamine, N-ethyl-diethanolamine, N,N-dimethylethanolamine and their reaction products with alkylene oxides such as propylene oxide and/or ethylene oxide.

Silaamines having carbon-silicon bonds as described, e.g., in German Patent No. 1,229,290 and U.S. Pat. No. 3,620,984 may also be used as catalysts. Examples include 2,2,4-trimethyl-2-silamorpholine and 1,3-diethylaminoethyltetramethyldisoloxane.

Basic nitrogen compounds such as tetraalkylammonium hydroxides, alkali metal hydroxides such as sodium phenolate and alkali metal alcoholates such as sodium methylate may also be used as catalysts. Hexahydrotriazines are also suitable catalysts.

Organic metal compounds may also be used as catalysts according to the invention, in particular organic tin compounds. The organic tin compounds used are preferably tin(II) salts of carboxylic acids such as tin(II) acetate, tin(II) octoate, tin(II) ethyl hexoate and tin(II) laurate and tin(IV) compounds such as dibutyl tin oxide, dibutyl tin dichloride, dibutyl tin diacetate, dibutyl tin dilaurate, dibutyl tin maleate or dioctyl tin diacetate. All the above-mentioned catalysts may, of course, be used as mixtures.

Further examples of catalyst which may be used according to the invention and details concerning the activity of the catalysts are known and are described, e.g., in Kunststoff-Handbuch, Volume VII, published by Vieweg and Hochtlen, Carl-Hanser-Verlag, Munich 1966, pages 96 to 102.

The catalysts, when used, are generally used in a quantity of between about 0.001 and 10%, by weight, based on the quantity of primary hydroxyl group containing polyethers.

Surface active additives such as emulsifiers and foam stabilizers may also be used according to the invention. Suitable emulsifiers include, e.g., the sodium salts of ricinoleic sulphonates or salts of fatty acids with amines such as oleic acid diethylamine or stearic acid diethanolamine. Alkali metal or ammonium salts of sulphonic acids such as dodecylbenzene sulphonic acid or dinaphthylmethane disulphinic acid or of fatty acids such as ricinoleic acid or of polymeric fatty acids may also be used as surface active additives.

Polyether siloxanes are particularly suitable foam stabilizers, especially useful are those which are water soluble. These compounds generally have a polydimethyl siloxane group attached to a copolymer of ethylene oxide and propylene oxide. Foam stabilizers of this kind are known and have been described, for example, in U.S. Pat. Nos. 2,834,748, 2,917,480 and 3,629,308. It may, however, be advantageous to carry out the process according to the invention without foam stabilizers.

Other additives which may also be used according to the invention include reaction retarders, e.g., substances which are acid in reaction such as hydrochloric acid or organic acid halides, cell regulators such as paraffins or fatty alcohols or dimethyl polysiloxanes, pigments, dyes, flame retarding agents such as tris-chloroethyl phosphate, tricresyl phosphate or ammonium phosphate and polyphosphates, stabilizers against ageing and weathering, plasticizers, fungistatic and bacteriostatic substances, and fillers such as barium sulphate, kieselguhr, carbon black or whiting.

Other examples of surface active additives, foam stabilizers, cell regulators, reaction retarders, stabilizers, flame retarding substances, plasticizers, dyes, fillers and fungistatic and bacteriostatic substances which may be used according to the invention and details concerning the use and mode of these additives are known and may be found, e.g., in Kunststoff-Handbuch, Volume VII, published by Vieweg and Hochtlen, Carl-Hanser-Verlag, Munich 1966, on pages 103 to 113.

According to the invention, the components may be reacted together by known processes often using mechanical devices such as those described in U.S. Pat. No. 2,764,565. Details concerning processing apparatus which may be used according to the invention may be found in Kunststoff-Handbuch, Volume VII, published by Vieweg and Hochtlen, Carl-Hanser-Verlag, Munich, 1966, pages 121 and 205.

According to the invention, the foaming reaction for producing foam products is often carried out inside molds. In this process, the foamable reaction mixture is introduced into a mold which may be made of a metal such as aluminum or a plastics material such as an epoxide resin. The reaction mixture foams up inside the mold to produce the shaped product. The process of foaming in molds is carried out to produce a product having a cellular structure on its surface. According to the invention, the desired result can be obtained by introducing just sufficient foamable reaction mixture to fill the mold with foam after the reaction is completed.

So-called external mold release agents known in the art, such as silicone waxes and oils, are frequently used when foaming is carried out inside the molds. The process may also be carried out with the aid of so-called internal mold release agents, if desired, in combination with external mold release agents, e.g., described in German Offenlegungsschriften Nos. 2,121,670 and 2,307,589.

Cold setting foams may also be produced, as described in British Patent No. 1,162,517 and German Offenlegungsschrift No. 2,153,086.

Foams may, of course, also be produced by the process of block foaming or by the laminator process known in the art. The products obtainable according to the invention may be used, for example, as upholstery or padding materials.

The invention is further illustrated but is not intended to be limited by the following examples in which all parts and percentages are by weight unless otherwise specified.

EXAMPLES

In the examples which follow, the following materials were used:
(A) POLYOL A: a glycerin initiated-propylene oxide/ethylene oxide polyether (weight ratio of PO to EO of about 5:1) having a molecular weight of about 6000.
(B) POLYOL B: a propylene glycol initiated-propylene oxide/ethylene oxide polyether (weight ratio of PO to EO of about 7:1) having a molecular weight of about 4000.
(C) POLYAMINE A: an approximately 400 molecular weight difunctional primary amine terminated polyether, available from Texaco as Jeffamine D-400.
(D) POLYAMINE B: Jeffamine D2000, a 2000 molecular weight polypropylene oxide diamine, available from Texaco.
(E) DYTEK A: 2-methylpentamethylenediamine, available from Dupont.
(F) SILOXANE A: B8002, a siloxane available from Goldschmidt.
(G) SILOXANE B: KS 43, a low molecular weight polyoxyalkylene polysiloxane available from Bayer AG.
(H) CELL OPENER A: a glycerin based ethylene oxide/propylene oxide polyether having an OH number of about 35.
(I) CELL OPENER B: a sorbitol initiated-propylene oxide/ethylene oxide polyether (weight ratio of PO to EO of about 5:1) having an OH number of 100.
(J) WATER
(K) ISOCYANATE: Mondur MRS-2, available from Mobay, a polymethylenepoly(phenyl isocyanate) containing 78% by weight diisocyanate, having an isocyanate content of about 33%, an equivalent weight of about 127, and a viscosity of about 22 cps at 25° C.

In the examples, the components of the B-side were accurately weighed into a suitable container and mixed using an air driven two blade mixer. The resultant mixture was then taken to the metering equipment. The metering equipment was flushed with the mixture and calibrated for the desired foam index.

The mixture was mixed with the isocyanate using high pressure metering equipment (HENNECKE HK100) and a Hennecke MQ-12-2 self-cleaning mixhead. Process settings were as follows:

| TEMPERATURE MIX/ISO: | 80/80° F. |
|---|---|
| MIX PRESSURES MIX/ISO | 2500/1600 psi |
| MOLD TEMP °F. | 130-150 |
| MOLD RELEASE | Brulin 2023 |
| DEMOLD TIME | 3-5 minutes |

The reaction mixture was metered into a 15 inch × 15 inch × 4 mold (which had been previously sprayed with the mold release), in an amount sufficient to give the desired foam density. The mold was then closed and the foam part demolded after the reaction was complete. The parts were labelled and tested for physical properties. The parts were aged under standard ASTM conditions (50% RH, 72°-74°F.) for three days. The parts were then tested under ASTM 2406 laboratories procedures as specified in Chrysler MS-DC634.

The formulations used and the results obtained were as reported in the following table (all amounts are in parts by weight):

TABLE

| EXAMPLE | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| B-SIDE: | | | | | | | | | | | | | | | | | | |
| POLYOL A | 50 | 50 | 50 | 50 | 50 | 50 | 50 | 50 | 30 | 30 | 30 | 30 | 45 | 40 | 30 | 30 | 30 | 32 |
| POLYOL B | 50 | 50 | 50 | 50 | 50 | 50 | 50 | 50 | 60 | 60 | 60 | 60 | 52.5 | 55 | 60 | 60 | 60 | 66 |
| POLYAMINE A | 0.5 | 0.5 | 0.5 | 0.5 | — | — | — | — | — | — | — | — | — | — | — | — | — | — |
| POLYAMINE B | — | — | — | — | — | — | — | — | 10 | 10 | 10 | 10 | 2.5 | 5 | 10 | 10 | 10 | 2 |
| CELL OPENER A | 4.0 | 4.0 | 4.0 | 4.0 | — | — | — | — | — | — | — | — | — | — | — | — | — | — |
| CELL OPENER B | — | — | — | — | — | — | — | — | — | — | — | — | — | — | — | 1 | — | — |
| DYTEK A | — | — | — | — | 0.5 | 0.5 | 0.5 | 0.5 | 1 | 1 | 1 | 1 | .5 | .5 | .5 | .5 | 1 | .2 |
| SILOXANE A | 0.25 | 0.25 | 0.25 | 0.25 | — | — | — | — | — | — | — | — | — | — | — | — | — | — |
| SILOXANE B | — | — | — | — | 0.5 | 0.5 | 0.5 | 0.5 | 0.5 | 0.5 | 0.5 | 0.5 | .5 | .5 | .5 | .5 | .5 | .85 |
| WATER | 3.0 | 3.0 | 3.0 | 3.0 | 3.0 | 3.0 | 3.0 | 3.0 | 3.0 | 3.0 | 3.0 | 3.0 | 3 | 3 | 3 | 3 | 4 | 3 |
| Al/LV:1/1* | 0.7 | 0.7 | 0.7 | 0.7 | — | — | — | — | 0.6 | 0.6 | 0.6 | 0.6 | — | — | .6 | — | .3 | — |
| Al/LV:1/1.5 | — | — | — | — | — | — | — | — | — | — | — | — | — | — | — | — | — | .75 |
| Al/LV:1/4 | — | — | — | — | .95 | .95 | .95 | .95 | — | — | — | — | — | — | — | — | — | — |
| Al/LV:1/1.75 | — | — | — | — | — | — | — | — | — | — | — | — | .65 | .65 | — | .65 | — | — |
| Al/LV:10 | — | — | — | — | — | — | — | — | — | — | — | — | — | — | — | .65 | — | — |
| ISO INDEX | 90 | 100 | 110 | 120 | 90 | 100 | 110 | 120 | 90 | 100 | 110 | 120 | 100 | 100 | 100 | 100 | 100 | 100 |
| RESULTS: | | | | | | | | | | | | | | | | | | |
| Density (kg/m$^3$) | 49 | 44 | 43 | 46 | 42 | 44 | 42 | 42 | 45 | 42 | 41 | 43 | 42.3 | 43.1 | 41.3 | 46.4 | 36.8 | 43.7 |
| Tensile (kPa) | 136 | 131 | 141 | 186 | 97 | 145 | 154 | 197 | 118 | 137 | 170 | 200 | 155 | 154 | 155 | 143 | 173 | 146 |
| Elongation (%) | 170 | 134 | 134 | 114 | 157 | 153 | 136 | 145 | 159 | 148 | 144 | 137 | 153 | 144 | 160 | 156 | 134 | 156 |
| Tear Strength (N/m) | 189 | 215 | 228 | 236 | 184 | 201 | 227 | 315 | 263 | 271 | 368 | 438 | 245 | 259 | 264 | 259 | 315 | 245 |
| COMPRESSION SET (%)*[1] (based on original deflection) | | | | | | | | | | | | | | | | | | |
| 2A 50 | 71.8 | 22.1 | 22.2 | 21.1 | 11.9 | 10.8 | 11.2 | 13.9 | 20 | 14.8 | 13 | 21.4 | 16.4 | 21 | 16.4 | 16.8 | 28.4 | 19 |
| 2A 75 | 92.7 | 93.5 | 89 | 77.1 | 56.6 | 8.8 | 10.4 | 12.8 | 64 | 23.5 | 11.8 | 12.0 | 14.4 | 25 | 12.8 | 18.2 | 20 | 25.4 |
| 2C 50 | 48.5 | 28.3 | 25.3 | 18.5 | 17.5 | 13.1 | 12.8 | 15.8 | 18 | 16.8 | 15.4 | 15.8 | 15.4 | 21.4 | 19.6 | 17.7 | 25.2 | 16.8 |
| 2C 75 | 87.4 | 85.8 | 69.7 | 17.2 | 12.8 | 11.3 | 11.2 | 14.2 | 16 | 14.4 | 15.0 | 14.2 | 16.5 | 20.2 | 14.1 | 13.3 | 23.4 | 14.9 |

*Al refers to Niax Al, a tertiary amine catalyst available from Union Carbide; LV refers to Dabco 33LV, a tertiary amine catalyst available from Air Products; the numbers (e.g. 1/1, 1/1.5, etc.) refer to the weight ratio of Al to LV.
*[1]2A is the original foam, while 2C is the foam humid aged to the Chrysler specification. 50 and 75 are the % deflections for the test.

Examples 1 through 4 are comparative examples. All the other examples had excellent processing characteristics. As far as the compression set data, in general values of less than 30% are desirable, with the lower the % the better the value.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A flexible foam prepared by reacting:
   (A) from more than 0 to up to 3 parts by weight per 100 parts by weight of components (B) and (C) of an amine of the formula:

$$H_2N-R-NH_2$$

where R is a $C_3$ to $C_{10}$ straight or branched alkylene group, or a $C_4$ to $C_{15}$ alicyclic group,
   (B) from 0 to 30% by weight of a polyoxyalkylene polyamine having a molecular weight of from about 400 to about 5000 and containing from 2 to 3 primary amino groups, and
   (C) from 70 to 100% by weight of one or more polyether polyhydroxyl compounds having hydroxyl functionalities of from 2 to 3 and molecular weights of from about 1000 to about 10,000, the percents by weight of components B) and C) totalling 100%; and
   (D) a polymethylene poly phenyl isocyanate) containing from about 40 to about 85% by weight of methylenebis(phenyl isocyanate) and/or a prepolymer of such isocyanate, said prepolymer having an isocyanate content of from about 15 to about 30% by weight, in the presence of
   (E) a blowing agent, at an isocyanate index of from 60 to 140.

2. The foam of claim 1, wherein R is a $C_3$ to $C_{10}$ branched chain alkylene group.

3. The foam of claim 2, wherein component (A) is 1,5-diamino-2-methylpentane.

4. The foam of claim 1, wherein component (A) is present in an amount of from 0.05 to 2.5 parts by weight.

5. The foam of claim 4 wherein component (A) is present in an amount of from 0.25 to 1.5 parts by weight.

6. The foam of claim 4 wherein component (B) is present in an amount of from 1 to 20% by weight.

7. The foam of claim 6 wherein component (B) is present in an amount of from 2.5 to 15% by weight.

8. The foam of claim 1, wherein said index is from 90 to 120.

* * * * *